US012791890B2

(12) United States Patent
Nakatogawa

(10) Patent No.: US 12,791,890 B2
(45) Date of Patent: Nov. 10, 2026

(54) CAMERA MODULE HAVING LIQUID CRYSTAL PANEL FORMED AT APERTURE

(71) Applicant: Magnolia White Corporation, Tokyo (JP)

(72) Inventor: Hirondo Nakatogawa, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 35 days.

(21) Appl. No.: 18/987,410

(22) Filed: Dec. 19, 2024

(65) Prior Publication Data

US 2025/0116892 A1 Apr. 10, 2025

Related U.S. Application Data

(63) Continuation of application No. PCT/JP2023/015021, filed on Apr. 13, 2023.

(30) Foreign Application Priority Data

Jun. 23, 2022 (JP) ................................ 2022-101170

(51) Int. Cl.
*G02F 1/133* (2006.01)
*G01C 3/06* (2006.01)
(Continued)

(52) U.S. Cl.
CPC ........... *G02F 1/13318* (2013.01); *G01C 3/06* (2013.01); *G02B 7/36* (2013.01); *G03B 7/00* (2013.01);
(Continued)

(58) Field of Classification Search
CPC ......... G02F 1/13318; G01C 3/06; G02B 7/36; G03B 7/00; G03B 7/093; G03B 7/095;
(Continued)

(56) References Cited

U.S. PATENT DOCUMENTS

| | | | | |
|---|---|---|---|---|
| 2011/0085074 A1* | 4/2011 | Sonoda | G03B 7/095 348/E5.04 |
| 2013/0250062 A1* | 9/2013 | Tin | H04N 13/122 348/46 |

(Continued)

FOREIGN PATENT DOCUMENTS

| | | |
|---|---|---|
| JP | 2006-285110 A | 10/2006 |
| JP | 2008-092416 A | 4/2008 |

(Continued)

OTHER PUBLICATIONS

Notice of Reasons for Refusal in Japanese Application No. 2024-528331 dated Aug. 5, 2025 (with machine translation).

(Continued)

*Primary Examiner* — Twyler L Haskins
*Assistant Examiner* — Akshay Trehan
(74) *Attorney, Agent, or Firm* — Michael Best & Friedrich LLP

(57) ABSTRACT

According to one embodiment, a camera module includes an image sensor and a liquid crystal panel. The liquid crystal panel includes an aperture portion, a liquid crystal layer overlapping the aperture portion, an electrode overlapping the liquid crystal layer, and a driver configured to drive the liquid crystal layer by applying a voltage to the electrode. The driver is configured to drive the liquid crystal layer based on a first control value and drive the liquid crystal layer based on a second control value. A first image captured based on the first control value is used to calculate a distance to a subject having a first brightness. A second image captured based on the second control value is used to calculate a distance to a subject having a second brightness.

1 Claim, 13 Drawing Sheets

(51) Int. Cl.

| | |
|---|---|
| ***G02B 7/36*** | (2021.01) |
| ***G03B 7/00*** | (2021.01) |
| ***G03B 7/093*** | (2021.01) |
| ***G03B 9/02*** | (2021.01) |
| ***G03B 11/00*** | (2021.01) |
| ***G03B 15/00*** | (2021.01) |
| ***G03B 30/00*** | (2021.01) |
| ***H04N 23/55*** | (2023.01) |
| ***H04N 23/57*** | (2023.01) |
| ***H04N 23/71*** | (2023.01) |
| ***H04N 23/73*** | (2023.01) |
| ***H04N 23/75*** | (2023.01) |
| ***H04N 23/76*** | (2023.01) |

(52) U.S. Cl.
CPC ............... *G03B 7/093* (2013.01); *G03B 9/02* (2013.01); *G03B 11/00* (2013.01); *G03B 15/00* (2013.01); *G03B 30/00* (2021.01); *H04N 23/55* (2023.01); *H04N 23/57* (2023.01); *H04N 23/71* (2023.01); *H04N 23/73* (2023.01); *H04N 23/75* (2023.01); *H04N 23/76* (2023.01)

(58) Field of Classification Search
CPC .......... G03B 7/097; G03B 9/02; G03B 11/00; G03B 11/045; G03B 15/00; G03B 30/00; H04N 23/51; H04N 23/54; H04N 23/55; H04N 23/57; H04N 23/71; H04N 23/73; H04N 23/75; H04N 23/76
See application file for complete search history.

(56) References Cited

U.S. PATENT DOCUMENTS

| | | | | |
|---|---|---|---|---|
| 2015/0163474 | A1* | 6/2015 | You | H04N 13/254 348/46 |
| 2016/0138910 | A1* | 5/2016 | You | H04N 13/286 348/46 |
| 2017/0078550 | A1* | 3/2017 | Terasawa | G03B 7/08 |
| 2020/0344431 | A1* | 10/2020 | Kobuse | H04N 25/616 |
| 2021/0266489 | A1 | 8/2021 | Wada | |

FOREIGN PATENT DOCUMENTS

| | | | | | |
|---|---|---|---|---|---|
| JP | 2008205530 | A | * | 9/2008 | H04N 23/00 |
| JP | 2020-28098 | A | | 2/2020 | |
| JP | 2021-197613 | A | | 12/2021 | |
| WO | WO-2021251260 | A1 | * | 12/2021 | H04N 23/75 |

OTHER PUBLICATIONS

International Search Report mailed on Jun. 27, 2023 for the corresponding PCT Application No. PCT/JP2023/015021, with English machine translation.
Japanese Office Action mailed on Jan. 6, 2026 for the corresponding Japanese Patent Application No. 2024-528331, with English machine translation.

* cited by examiner

CAMERA MODULE HAVING LIQUID CRYSTAL PANEL FORMED AT APERTURE

CROSS-REFERENCE TO RELATED APPLICATIONS

This application is a Continuation Application of PCT Application No. PCT/JP2023/015021, filed Apr. 13, 2023 and based upon and claiming the benefit of priority from Japanese Patent Application No. 2022-101170, filed Jun. 23, 2022, the entire contents of all of which are incorporated herein by reference.

FIELD

Embodiments described herein relate generally to a camera module.

BACKGROUND

A camera module including a liquid crystal panel and an image sensor (camera) provided on a rear of the liquid crystal panel has been developed.

Camera modules can capture images by making light incident on an image sensor, which the camera module includes. A coded aperture technology that uses a bokeh formed in the image captured by the camera module to calculate a distance to a subject in the image is known.

However, depending on images captured by the camera module, an appropriate distance cannot be calculated from the images.

DETAILED DESCRIPTION

Figure 1:
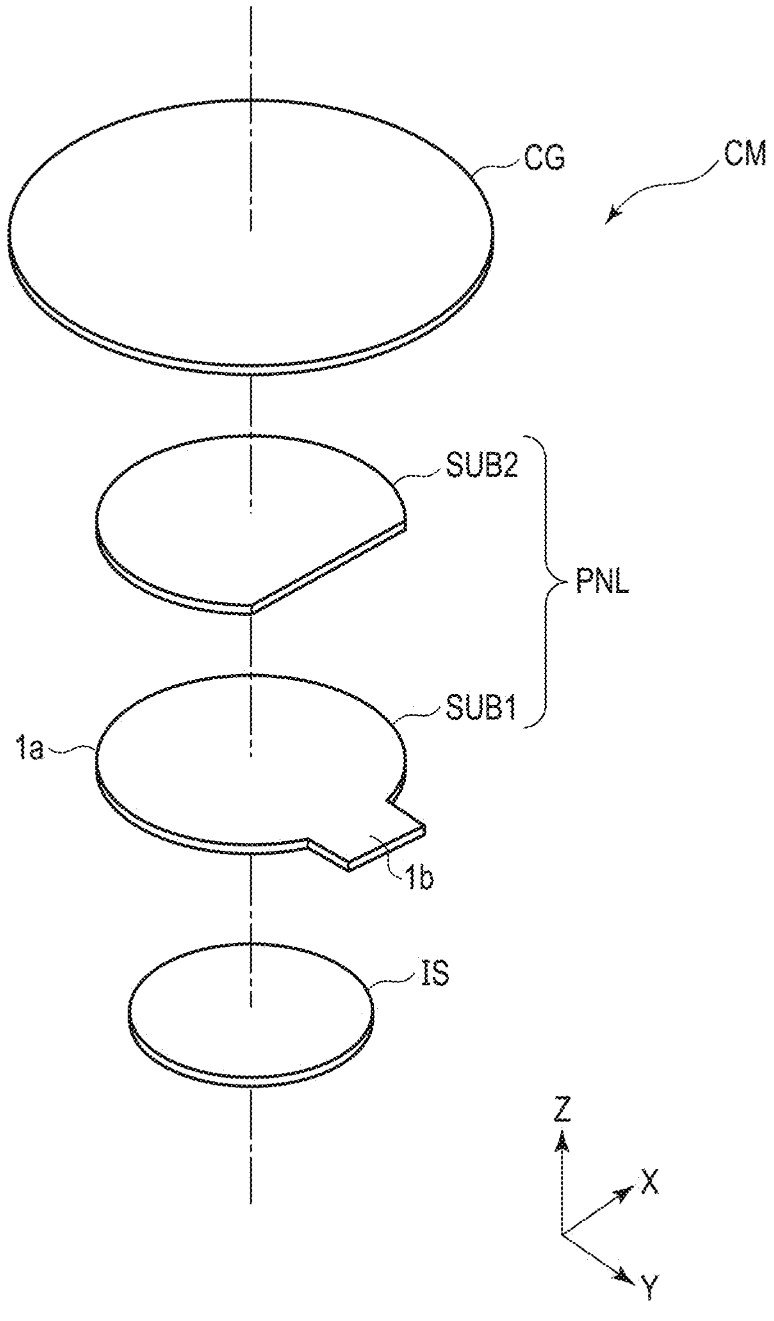
FIG. 1 is an exploded perspective view showing a configuration example of a camera module of an embodiment.

In general, according to one embodiment, a camera module includes an image sensor and a liquid crystal panel. The liquid crystal panel includes an aperture portion arranged at a position on which light is made incident on the image sensor, a liquid crystal layer arranged at a position overlapping the aperture portion, an electrode arranged at a position overlapping the liquid crystal layer, and a driver configured to drive the liquid crystal layer by applying a voltage to the electrode. The driver is configured to drive the liquid crystal layer based on a first control value for capturing a subject present in an image capturing range having a first brightness, and drive the liquid crystal layer based on a second control value for capturing a subject present in the image capturing range having a second brightness different from the first brightness. A first image captured based on amount of light made incident on the image sensor by the liquid crystal layer being driven based on the first control value is used to calculate a distance to the subject having the first brightness. A second image captured based on amount of light made incident on the image sensor by the liquid crystal layer being driven based on the second control value is used to calculate a distance to the subject having the second brightness.

Embodiments will be described hereinafter with reference to the accompanying drawings. The disclosure is a mere example, and arbitrary change of gist which can be easily conceived by a person of ordinary skill in the art naturally falls within the inventive scope. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. Besides, in the specification and drawings, the same elements as those described in connection with preceding drawings are denoted by like reference numerals, and a detailed description thereof is omitted unless otherwise necessary.

FIG. 1 is an exploded perspective view showing a configuration example of a camera module of the present embodiment. FIG. 1 shows a three-dimensional space which is defined by a direction X, a direction Y orthogonal to the direction X, and a direction Z orthogonal to the direction X and the direction Y. The direction X, the direction Y, and the direction Z are orthogonal to each other, but may intersect at an angle other than 90 degrees. In addition, the direction Z is defined as an upper or upward direction while a direction opposite to the direction Z is defined as a lower or downward direction, in the present embodiment. According to "a second member above/on a first member" and "a second member below/under a first member", the second member may be in contact with the first member or may be remote from the first member.

As shown in FIG. 1, a camera module CM includes a liquid crystal panel PNL, which is covered with a cover glass CG as a cover member, and an image sensor IS (imaging element) provided on the lower side (rear) of the liquid crystal panel PNL.

The display panel PNL includes an array substrate SUB1 and a counter-substrate SUB2. In plan view in which the camera module CM is visually recognized from the direction Z, the array substrate SUB1 has a keyhole shape (contour) in which a first portion 1*a* having a substantially circular shape, and a second portion 1*b*, which is connected to the first portion 1*a* and has a substantially rectangular shape, are combined with each other. In contrast, the counter-substrate SUB2 has a shape such that the second portion 1*b* of the array substrate SUB1 is exposed in plan view when the counter-substrate SUB2 is provided at a position overlapping the first portion 1*a* of the array substrate SUB1.

Though not shown in FIG. 1, the display panel PNL further includes a liquid crystal layer held between the array substrate SUB1 and the counter-substrate SUB2.

The image sensor IS is a photoelectric conversion element that converts light made incident on the image sensor IS to a voltage signal (electric signal) and constitutes a camera capturing an image together with an optical system including at least one lens (not shown).

In the camera module CM of the present embodiment, the light having passed through the cover glass CG and the liquid crystal panel PNL (liquid crystal layer) is made incident on the image sensor IS by the liquid crystal layer, which the liquid crystal panel PNL includes, being driven. This allows the camera module CM to capture an image based on the light made incident on the image sensor IS.

FIG. 1 is a diagram for explaining the positional relationship among the cover glass CG, the display panel PNL (array substrate SUB1 and counter-substrate SUB2), and the image sensor IS (camera) in the Z direction, and the shapes and the like of the cover glass CG, the liquid crystal panel PNL, and the image sensor IS may be different from those shown in FIG. 1.

Figure 2:
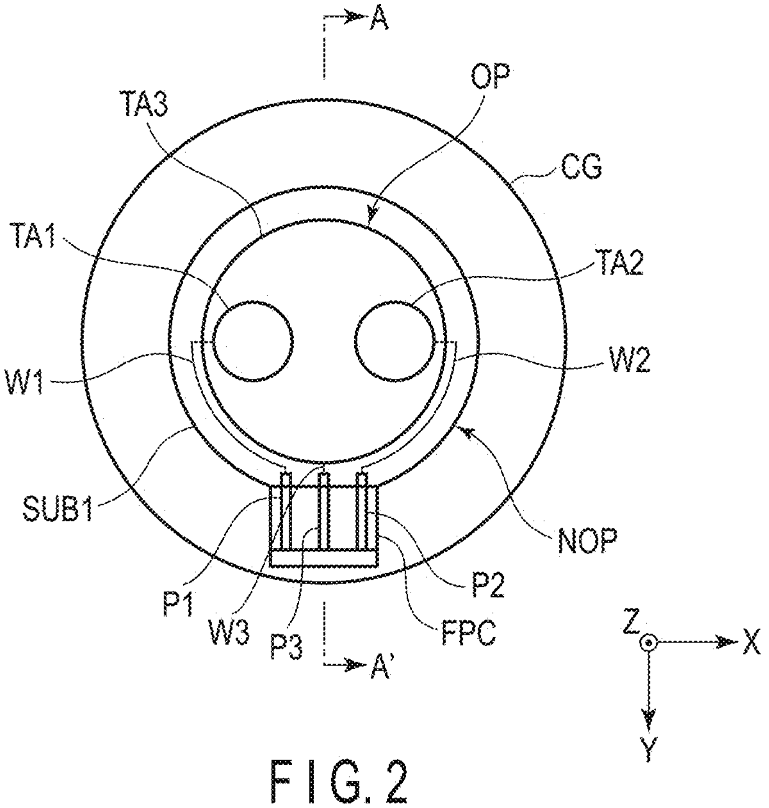
FIG. 2 is a plan view schematically showing an example of the camera module.

FIG. 2 is a plan view schematically showing the camera module CM. Though it is omitted for the sake of illustration, the counter-substrate SUB2 is provided between the cover glass CG and the array substrate SUB1. In addition, the image sensor IS is provided on the rear side of the array substrate SUB1 (direction opposite to the direction Z).

For example, the display panel PNL has an aperture portion OP having a circular shape. In the present embodiment, the aperture portion OP is a portion (area) overlapping the liquid crystal layer held between the array substrate SUB1 and the counter-substrate SUB2.

In the present embodiment, a plurality of areas are formed in the aperture portion OP. The plurality of areas formed in the aperture portion OP are areas that allow light to pass through them, for example, by driving liquid crystals (hereinafter referred to as a light transmissive area). The plurality of areas shown in the example shown in FIG. 2 include a first light transmissive area TA1 to a third light transmissive area TA3.

The first light transmissive area TA1 has a circular shape and is formed, for example, at a position that excludes the center of the aperture portion OP. More specifically, the first light transmissive area TA1 is formed at a position closer to the opposite side to the X direction from the center of the aperture portion OP.

The second light transmissive area TA2 has a circular shape and is formed, for example, at a position opposed to the first light transmissive area TA1 with the center of the aperture portion OP interposed therebetween. More specifically, the second light transmissive area TA2 is formed at a position closer to the X direction from the center of the aperture portion OP.

As the example shown in FIG. 2, the first light transmissive area TA1 and the second light transmissive area TA2 are formed to have sizes substantially equivalent to each other.

The third light transmissive area TA3 corresponds to an area in which the first light transmissive area TA1 and the second light transmissive area TA2 are excluded from the aperture portion OP.

The first light transmissive area TA1 to the third light transmissive area TA3 are assumed to be partitioned, for example, by a light-shielding area formed of a black matrix.

As described above, in order to make light incident on the image sensor IS, it is necessary to apply a voltage to an electrode provided at a position corresponding to the liquid crystal layer (hereinafter referred to as a drive electrode) and drive the liquid crystal layer. In the present embodiment, the display panel PNL is assumed to include a plurality of driving electrodes corresponding to each of the plurality of light transmissive areas.

In the example shown in FIG. 2, the liquid crystal panel PNL includes a first drive electrode provided at a position overlapping the first light transmissive area TA1, a second drive electrode provided at a position overlapping the second light transmissive area TA2, and a third drive electrode overlapping the third light transmissive area TA3.

This configuration allows to drive the liquid crystal layer to allow light to pass through the image sensor IS via the first light transmissive area TA1 when a voltage is applied to the first drive electrode alone. In addition, for example, when a voltage is applied to the second drive electrode alone, the liquid crystal layer can be driven to allow light to pass through the image sensor IS via the second light transmissive area TA2. In addition, for example, when a voltage is applied to the third drive electrode alone, the liquid crystal layer can be driven to allow light to pass through the image sensor IS via the third light transmissive area TA3. Here, it assumes a case where the liquid crystal panel PNL adopts a normally-black mode in which light is allowed to pass through in a state where a voltage is applied to the drive electrode (in other words, on state).

The present embodiment assumes that an image based on light having passed through each of the first light transmissive area TA1 to the third light transmissive area TA3 and made incident on the image sensor IS (in other words, an image of a subject captured by the camera module CM) is used by the camera module CM to calculate the distance from the camera module CM to a subject in the image (image sensor IS) (hereinafter referred to as distance to subject).

For example, the coded aperture technology can be adopted as the technique to calculate the distance to subject from the image. The detailed explanations on the coded aperture technology are omitted. In short, the coded aperture technology calculates the distance to subject by analyzing a bokeh formed in an image depending on a position of the subject.

That is, the camera module CM can be used, for example, to calculate the distance to subject based on an image and make a distance map (depth map) indicating the distance to subject. The processes to calculate the distance to subject and make a distance map and the like are achieved by a certain application program running on an electronic apparatus (electronic apparatus on which the camera module CM is mounted) connected, for example, to the camera module CM.

Figure 3:
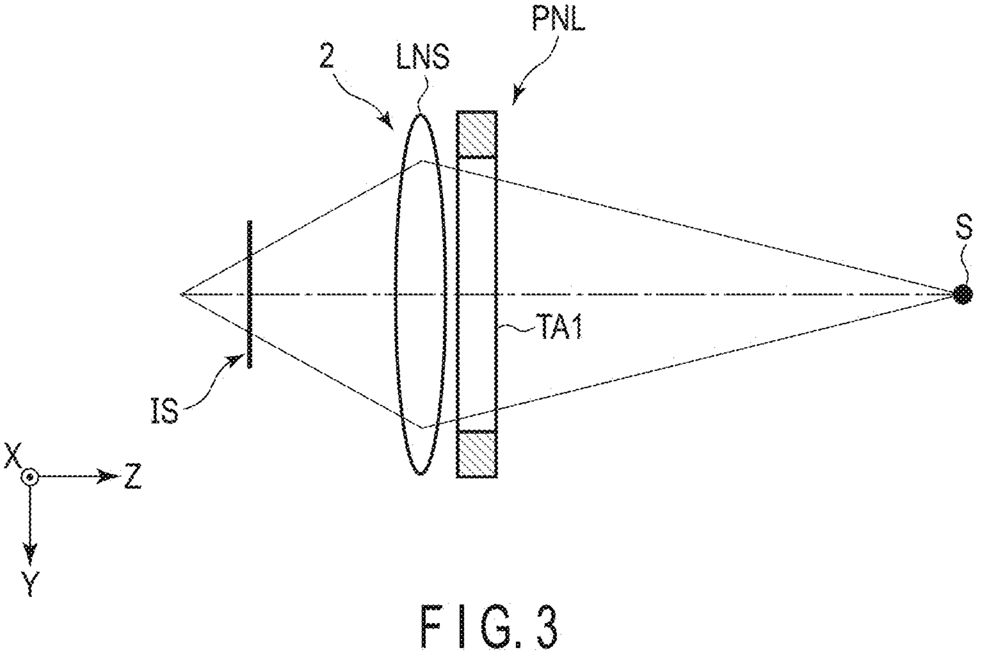
FIG. 3 is a diagram for explaining a principle to calculate a distance to subject using a camera module.

Here, a principle to calculate the distance to subject using an image captured by the camera module CM will be briefly described with reference to FIG. 3. FIG. 3 shows the positional relationship between the camera module CM and a subject. Though not shown in FIG. 1, a lens LNS is provided between the image sensor IS and the liquid crystal panel PNL in the camera module CM.

Here, it assumes a case where the distance to a subject S shown in FIG. 3 is calculated. Generally, in a camera, an image of the subject S can be captured by varying the distance between the lens LNS and the image sensor IS with the subject S being focused. When an image of the subject S is captured in a state where the subject S is not focused, as shown in FIG. 3, the focus position and the position of the image surface of the image sensor IS are displaced with respect to each other and thus a bokeh occurs in an image based on the light made incident on the image sensor IS.

The coded aperture technology calculates the distance to the subject S based on the bokeh formed in the image.

FIG. 3 shows a case where light passes through the first light transmissive area TA1. As described above, the present embodiment can increase the accuracy of the calculated distance by providing three light transmissive areas (first light transmissive area TA1 to the third light transmissive area TA3) and calculating the distance to the subject by using a plurality of images based on the light having passed through each of the three light transmissive areas (in other words, a plurality of patters of bokeh based on the light having passed through different light transmissive areas).

Here, the present embodiment can allow light to pass through the image sensor IS via each of the first light transmissive area TA1 to the third light transmissive area TA3 by applying a voltage to each of the first light transmissive area TA1 to the third light transmissive area TA3. In order to apply a voltage to the first light transmissive area TA1 to the third light transmissive area TA3, the driver (not shown) configured to drive the liquid crystal panel PNL (liquid crystal layer) and the first light transmissive area TA1 to the third light transmissive area TA3 need to be electrically connected to each other.

In this case, for example, the first drive electrode (in other words, a drive electrode provided at a position overlapping the first light transmissive area TA1) is electrically connected to a first pad P1 through a first wiring W1. This first pad P1 is electrically connected to the driver through a flexible wiring board FPC.

In addition, the second drive electrode (in other words, a drive electrode provided at a position overlapping the second light transmissive area TA2) is electrically connected to a second pad P2 through a second wiring W2. This second pad P2 is electrically connected to the driver through the flexible wiring board FPC.

Similarly, the third drive electrode (in other words, a drive electrode provided at a position overlapping the third light transmissive area TA3) is electrically connected to a third pad P3 through a third wiring W3. This third pad P3 is electrically connected to the driver through the flexible wiring board FPC.

For example, outer lead bonding (OLB) pad may be adopted as the first pad P1 to the third pad P3.

In addition, the liquid crystal panel PNL includes a non-aperture portion NOP surrounding the aperture portion OP. The first pad P1 to the third pad P3 are provided in the non-aperture portion NOP as shown in FIG. 2. In the example shown in FIG. 2, the first pad P1 to the third pad P3 elongate in the direction Y and are aligned in the X direction. In this case, the first wire W1 to the third wire W3 are connected to an end portion of a side opposite to the Y direction of each of the first pad P1 to the third pad P3.

Figure 4:
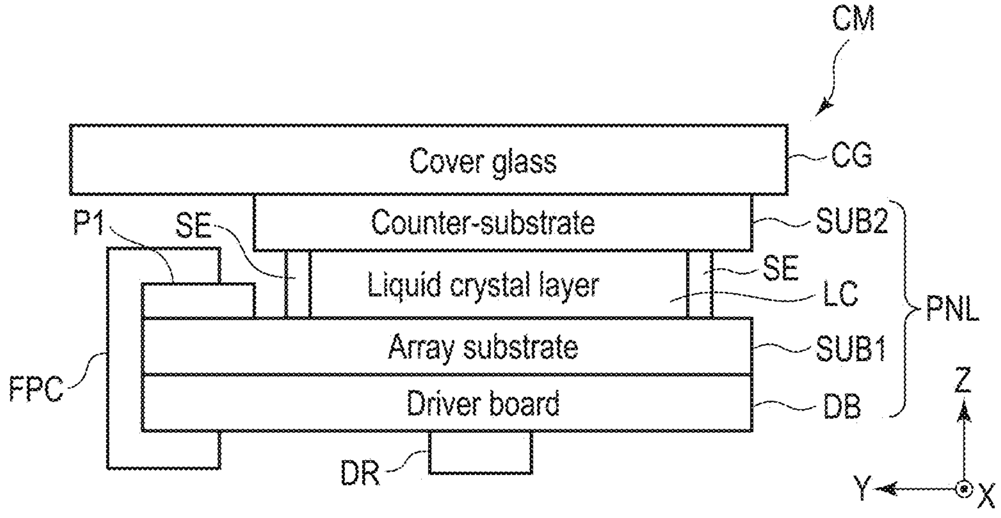
FIG. 4 is a cross-sectional view schematically showing the camera module taken along line A-A' shown in FIG. 2.

Here, FIG. 4 is a cross-sectional view schematically showing the camera module CM shown in FIG. 2 taken along line A-A'. As shown in FIG. 4, the liquid crystal panel PNL includes a driver board DB provided on the rear (opposite side of the direction Z) of the array substrate SUB1, in addition to the array substrate SUB1, the counter-substrate SUB2, and the liquid crystal layer LC held between the array substrate SUB1 and the counter-substrate SUB2.

As shown in FIG. 4, a driver DR, which drives the liquid crystal panel PNL (liquid crystal layer LC) is mounted on the driver board DB. The flexible wiring board FPC elongates along the first pad P1 to the third pad P3 (in other words, in the Y direction). The first pad P1 shown in FIG. 4 is connected to the driver DR via the flexible wiring board FPC bent on the end portion of the Y direction side of the first pad P1. The first pad P1 and the flexible wiring board FPC can be electrically connected to each other, for example, by being pressed to each other via an anisotropic conductive film (ACF).

The liquid crystal panel PNL includes a sealing material SE located in the non-aperture portion NOP. The array substrate SUB1 and the counter-substrate SUB2 are made to adhere to each other by the sealing material SE. This can form the liquid crystal layer LC in a space surrounded by the array substrate SUB1, the counter-substrate SUB2, and the sealing member SE.

Though not shown in FIG. 4, the image sensor IS is provided, for example, between the array substrate SUB1 and the driver board DB.

An example of the liquid crystal panel PNL, which the camera module CM includes, will be briefly described with reference to FIG. 5. The light transmissive area (in other words, the aperture portion OP) included in the liquid crystal panel PNL will be mainly described.

Figure 5:
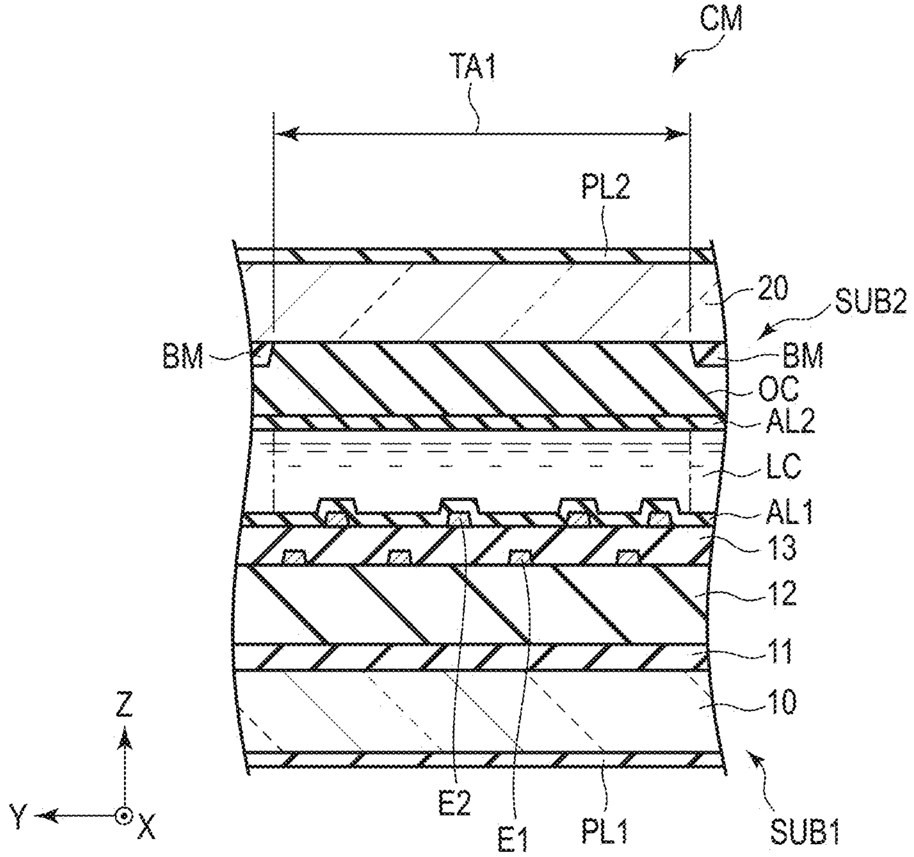
FIG. 5 is a cross-sectional view showing a light transmissive area included in the liquid crystal panel, which the camera module includes.

As shown in FIG. 5, the array substrate SUB1 includes insulating films 11, 12, and 13 between an insulating substrate 10 and an alignment film AL1. In addition, a polarizer PL1 is formed outside the array substrate SUB1.

The insulating layer 11 is provided on the insulating substrate 10. The insulating layer 12 is provided on the insulating layer 11.

As shown in FIG. 5, a first drive electrode E1 is provided on the insulating layer 12 and is covered with the insulating layer 13. A first drive electrode E2 is provided on the insulating layer 13 and is covered with the alignment film AL1. The alignment film AL1 is in contact with the liquid crystal layer LC.

The first drive electrodes E1 and E2 are formed of, for example, a transparent conductive material such as indium tin oxide (ITO) or indium zinc oxide (IZO). In the example shown in FIG. 5, the insulating layer 13 is interposed between the first drive electrodes E1 and E2. These first drive electrodes E1 and E2 may be formed on the layer.

On the other hand, the counter-substrate SUB2 includes a light-shielding layer BM, a transparent layer OC, an alignment film AL2, and the like on the side opposed to the array substrate SUB1 of an insulating substrate 20.

The light-shielding layer BM is arranged on the inside surface of the insulating substrate 20 to form a light-shielding area, which partitions the first light transmissive area TA1 and the like. The transparent layer OC covers the insulating substrate 20 and the light-shielding layer BM. The alignment film AL2 covers the transparent layer OC and is in contact with the liquid crystal layer LC.

The liquid crystal layer LC is driven by a voltage being applied to the first drive electrodes E1 and E2. In this case, for example, a first voltage is applied to the first drive electrode E1 and a second voltage is applied to the first drive electrode E2 via the first pad P1 and the flexible wiring board FPC provided at a position overlapping the non-aperture portion OP. For example, one of the first and second voltages has a voltage level of positive-polarity. The other has a voltage level of negative-polarity.

In the present invention, the liquid crystal layer LC is driven by applying a voltage between the first drive electrodes E1 and E2 such that light passes through the image sensor IS via the first light transmissive area TA1. This drive of the liquid crystal layer LC is achieved by the driver DR.

For example, it is assumed that transmission axes of polarizers PL1 and PL2 intersect each other, and liquid crystal molecules contained in the liquid crystal layer LC are initially arranged in the direction of the transmission axis of the polarizer PL1 between the alignment films AL1 and AL2.

In this case, a phase difference is not formed in the off state where a voltage is not applied between the first drive electrodes E1 and E2 (in other words, in a state where the liquid crystal layer LC is not driven). Therefore, light transmittance rate of the first light transmissive area TA1 becomes the smallest in this state (in other words, light cannot pass through the first light transmissive area TA1).

On the other hand, a phase difference is formed in the off state where a voltage is applied between the first drive electrodes E1 and E2 (in other words, in a state where the liquid crystal layer LC is driven). Therefore, light transmittance of the first light transmissive area TA1 becomes greater in this state (in other words, light can pass through the first light transmissive area TA1). Light having passed through the first light transmissive area TA1 is made incident on the image sensor IS. Then, the camera module CM can capture an image based on the light made incident on the image sensor IS.

It assumes a case where the liquid crystal panel PNL adopts the normally-black mode in which light does not pass through in the off state. The present embodiment may adopt the normally-white mode in which light does not pass through in the on state (light is allowed to pass through in the on state).

The first light transmissive area TA1 has been mainly described with reference to FIG. 4 and FIG. 5. The second light transmissive area TA2 and the third light transmissive area TA3 are configured in the same manner as the first light transmissive area TA1 except a position in the aperture portion OP, the size, and the shape.

The present embodiment assumes a case where the three light transmissive areas (first light transmissive area TA1 to the third light transmissive area TA3) are formed in the aperture portion OP having the circular shape. The shape of the aperture OP, the position of the light transmissive area in the aperture OP, the size, the shape, and the number may be changed according to a subject distance to which is to be calculated (in other words, surrounding in which an image is captured), and the like.

Figure 6:
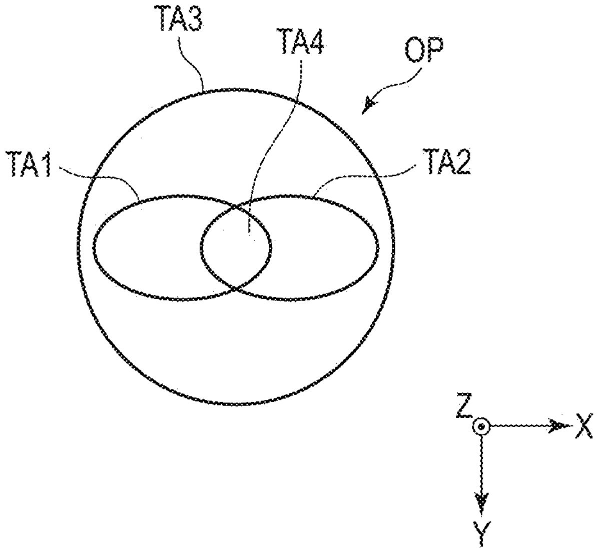
FIG. 6 is a diagram showing another example of the light transmissive area formed in an aperture portion.
Figure 7:
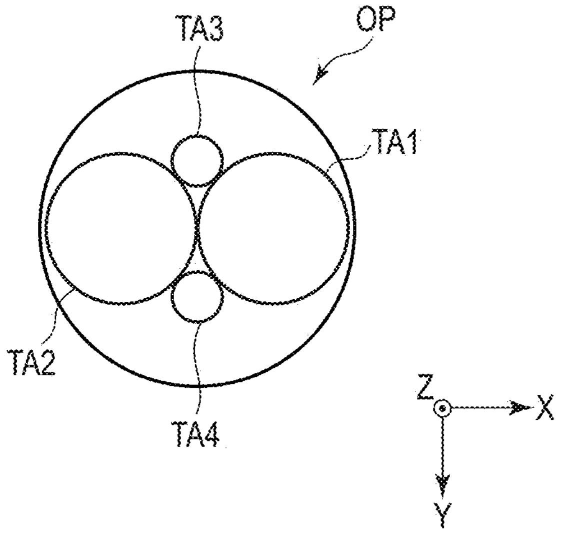
FIG. 7 is a diagram showing still another example of the light transmissive area formed in the aperture portion.
Figure 8:
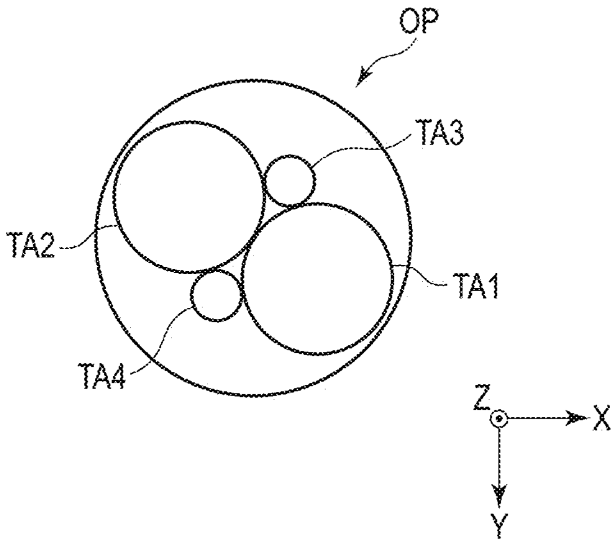
FIG. 8 is a diagram showing still another example of the light transmissive area formed in the aperture portion.
Figure 9:
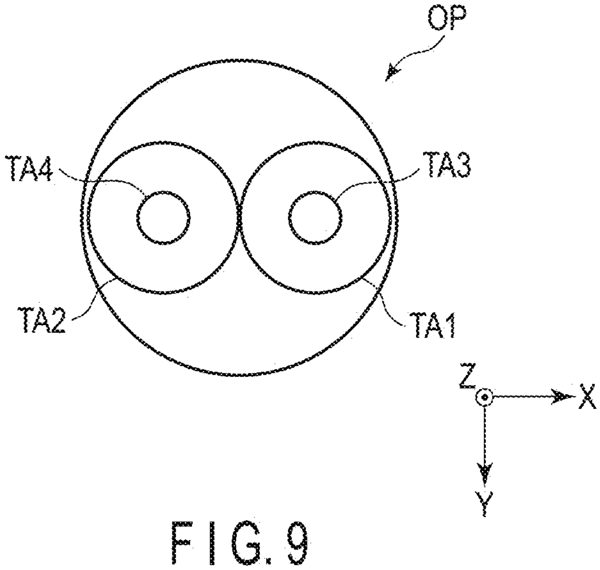
FIG. 9 is a diagram showing still another example of the light transmissive area formed in the aperture portion.

More specifically, for example, four light transmissive areas TA1 to TA4 shown in FIG. 6 may be formed in the aperture portion OP. Further, the four light transmissive areas TA1 to TA4 (in other words, two pairs of coded apertures) shown in FIG. 7 may be formed in the aperture portion OP. Further, a configuration may be adopted in which a distance is calculated by using the light transmissive areas TA1 and TA2 (image based on the light having passed through the areas) when a subject is present at a position having an intermediate distance or a long distance from the camera module CM. Further, a configuration may be adopted in which a distance is calculated by using the light transmissive areas TA3 and TA4 (image based on the light having passed through the areas) when a subject is present at a position having a short distance from the camera module CM. Further, by providing the light transmissive areas TA1 to TA4 shown in FIG. 7 in the manner shown in FIG. 8, an error in the X direction and Y direction in the distance to a subject to be calculated may be eased. More specifically, for example, four light transmissive areas TA1 to TA4 shown in FIG. 7 may be formed in the manner shown in FIG. 9.

The present embodiment assumes a case where a plurality of light transmissive areas are formed (provided) in the aperture portion OP. As far as the distance to subject can be calculated, the configuration in which one light transmissive area is formed in the aperture portion OP may be adopted.

The present embodiment calculates the distance to subject by an image captured by light that has passed through at least one light transmissive area being made incident on the image sensor IS. In some cases, the accuracy of the distance to subject is low depending on the brightness of a subject in the image.

Figure 10:
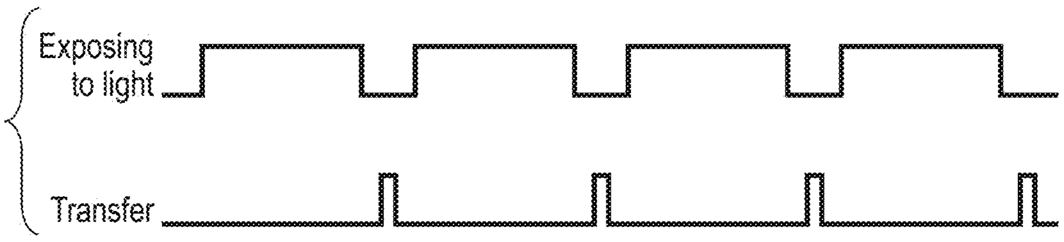
FIG. 10 is a diagram for explaining operations of a camera module of a comparative example of the present embodiment.

Here, operations of a camera module CM (driver DR and image sensor IS) of a comparative example of the present embodiment will be briefly described with reference to FIG. 10. FIG. 10 shows the time in which the image sensor IS receives light having passed through the liquid crystal layer (hereinafter referred to as light exposure time) and the timing at which an image captured by light being made incident on the image sensor IS in the exposure time is transferred to the outside.

Here, it assumes the camera module CM capturing a plurality of images (in other words, a video) while calculating the distance to subject using each of the images. The present embodiment assumes that the image transferred from the image sensor IS to the outside includes a voltage signal (brightness value) corresponding to amount of light made incident on the image sensor IS (in other words, the brightness of subject).

FIG. 10 shows that the image captured by light being made incident on the image sensor IS due to the drive of the liquid crystal layer LC by the driver DR according to a predetermined frame rate (predetermined light exposure time) is sequentially driven (output) from the image sensor IS.

Figure 11:
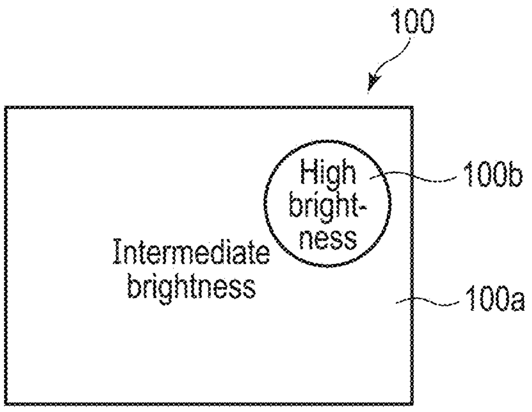
FIG. 11 is a diagram showing an example of an image transferred from the image sensor.

FIG. 11 shows an example of an image transferred from the image sensor IS when the driver DR drives the liquid crystal layer LC to achieve the light exposure time shown in FIG. 10. It assumes a case where a subject having the intermediate brightness and a subject having the high brightness are present in the image capturing range of the camera module CM. Here, an image 100 shown in FIG. 11 includes an intermediate brightness area 100*a* and a high brightness area 100*b*.

The intermediate brightness area 100*a* is an area for containing a subject having the intermediate brightness. The present embodiment uses a bokeh formed in the image to calculate the distance to subject. The bokeh can be relatively easily recognized in the intermediate brightness area 100*a*. Thus, the accurate calculation of the distance can be achieved.

In contrast, brightness is saturated (whiting occurs) in the high brightness area 100*b* containing a subject having the high brightness. Thus, bokeh cannot be observed and the distance to this subject cannot be calculated in this area.

That is, when the driver DR and the image sensor IS (camera module CM) are operated to repeatedly capture images in a certain light exposure time as shown in FIG. 10, the distance to subject (specifically, a subject having the high brightness) cannot be appropriately calculated (in other words, cannot be measured) from the images.

In order to capture an image based on which the distance to subject can be appropriately calculated, the driver DR of the present embodiment drives the liquid crystal layer LC based on a control value (first control value) for capturing an image of a subject having the intermediate brightness (first brightness) present in the image capturing range and drives the liquid crystal layer LC based on a control value (second control value) for capturing an image of a subject having the high brightness (second brightness) present in the image capturing range.

Figure 12:
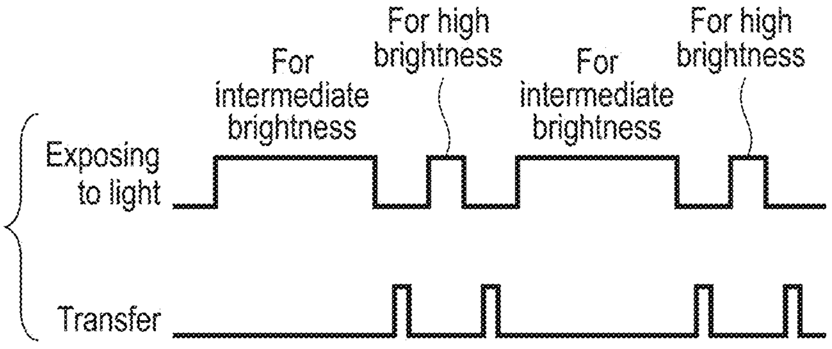
FIG. 12 is a diagram showing a first operation example of the camera module of the present embodiment.

A first operation example of the camera module CM of the present embodiment will be described with reference to FIG. 12. Similarly to FIG. 10, FIG. 12 shows the light exposure time of the image sensor IS and the timing at which an image, which has been captured by light being made incident on the image sensor IS in the exposure time, is transferred to the outside.

In the first operation example, the driver DR drives the liquid crystal layer LC based on the light exposure time for intermediate brightness (control value). In this case, the image, which has been captured based on light made incident on the image sensor IS in the light exposure time for intermediate brightness (hereinafter referred to as an image for intermediate brightness), is transferred from the image sensor IS.

Next, the driver DR drives the liquid crystal layer LC based on the light exposure time for high brightness (control value). In this case, the image, which has been captured based on the light made incident on the image sensor IS in the light exposure time for high brightness (hereinafter referred to as an image for high brightness), is transferred from the image sensor IS.

When the image is captured in the first operation example, an image for intermediate brightness and an image for high brightness are alternately captured (in other words, the drive of the liquid crystal layer LC based on the light exposure time for intermediate brightness and the drive of the liquid crystal layer LC based on the light exposure time for high brightness are repeatedly conducted).

Here, the light exposure time for intermediate brightness in the first operation example is the same as the light exposure time shown in FIG. 10. The light exposure time for high brightness is set to be shorter than the light exposure time for intermediate brightness. Therefore, by shortening the light exposure time in the cases of the image for high brightness, the brightness of a subject distance to which cannot be calculated in the image for intermediate brightness due to the saturation of the brightness can be suppressed. In other words, the image for intermediate brightness is an image for accurately calculating a distance to a subject having the intermediate brightness, and the image for high brightness is an image for accurately calculating a distance to a subject having the high brightness.

By adjusting the light exposure time, the first operation example can capture an image for intermediate brightness (first image) based on which a distance to a subject having the intermediate brightness can be calculated and an image for high brightness (second image) based on which a distance to a subject having the high brightness can be calculated.

The first operation example assumes a case where the driver DR drives the liquid crystal layer LC according to the light exposure time of the image sensor IS. This light exposure time may be adjusted by the liquid crystal panel PNL, or may be adjusted by, for example, controlling a physical shutter and the like.

The first operation example assumes that amount of received light of the image sensor IS (in other words, the brightness of a subject in an image) can be adjusted by the image sensor IS providing the light exposure time for intermediate brightness and the light exposure time for high brightness. In the display panel PNL, the light transmittance in the liquid crystal layer LC (in other words, amount of light made incident on the image sensor IS) can be adjusted by a voltage applied to a drive electrode provided at a position overlapping the liquid crystal layer LC.

Figure 13:
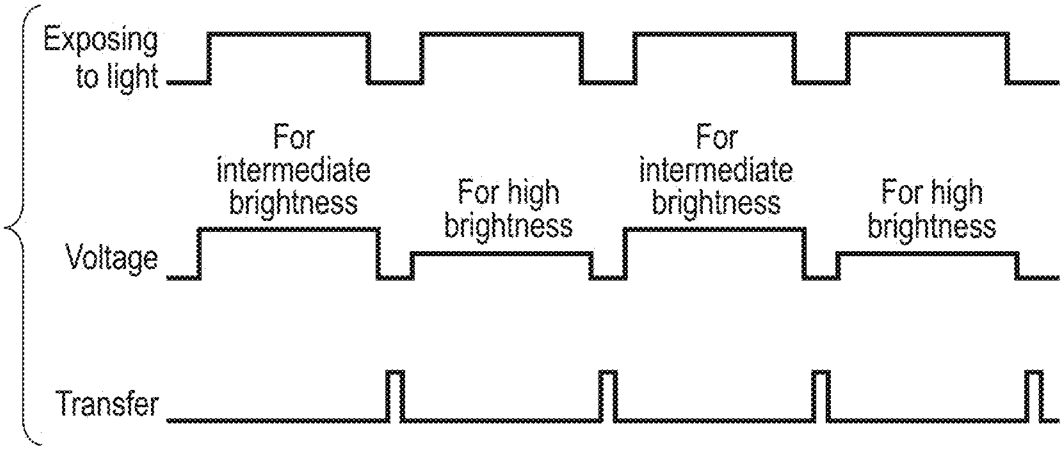
FIG. 13 is a diagram showing a second operation example of the camera module of the present embodiment.

A second operation example of the camera module CM of the present embodiment will be described with reference to FIG. 13. FIG. 13 shows time in which the driver DR drives the liquid crystal layer LC for making light incident on the image sensor IS (light exposure time), a value of a voltage applied to a drive electrode provided at a position overlapping the liquid crystal layer LC, and timing at which the image, which has been captured by the light being made incident on the image sensor IS in the light exposure time, is transferred to the outside from the image sensor IS. That is, in the second operation example, the liquid crystal panel PNL controls the light exposure time. It assumes the case where the liquid crystal panel PNL adopts the normally-black mode.

In the example of the second operation, the driver DR drives the liquid crystal layer LC by applying a voltage to the drive electrode based on a voltage value for intermediate brightness (control value). In this case, an image for intermediate brightness, which has been captured based on light made incident on the image sensor IS while the liquid crystal layer LC is driven based on the voltage value for intermediate brightness, is transferred from the image sensor IS.

Next, the driver DR drives the liquid crystal layer LC by applying a voltage to the drive electrode based on a voltage value for high brightness (control value). In this case, an image for high brightness, which has been captured based on light made incident on the image sensor IS while the liquid crystal layer LC is driven based on the voltage value for high brightness, is transferred from the image sensor IS.

Similarly to the first operation example, when a video is captured in the second operation example, an image for intermediate brightness and an image for high brightness are alternately captured (in other words, the drive of the liquid crystal layer LC based on the voltage value for intermediate brightness and the drive of the liquid crystal layer LC based on the voltage value for high brightness are repeatedly conducted).

The voltage value for intermediate brightness in the second operation example is the same as, for example, the voltage value applied to the drive electrode in the first operation example, and the like. In contrast, the voltage value for high brightness is set to be lower than the voltage value for intermediate brightness. In the liquid crystal panel PNL, which adopts the normally-black mode, a high light transmittance in the liquid crystal layer LC can be achieved by a high voltage being applied to the drive electrode. Thus, in the image for high brightness, the brightness of a subject distance to which cannot be calculated in the image for intermediate brightness due to the saturation of the brightness can be suppressed by lowering a voltage applied to the drive electrode. In other words, the image for high brightness in the second operation example is an image for accurately calculating a subject having the high brightness.

In other words, the image for intermediate brightness in the second operation example is the same as the image for intermediate brightness in the first operation example and thus is an image for accurately calculating a subject having the intermediate brightness.

The second operation example adopts the configuration in which the brightness of a subject is adjusted by a voltage applied to the drive electrode. Therefore, the light exposure time (time in which the liquid crystal layer LC is driven to make light incident on the image sensor IS) may be constant.

As described above, the second operation example can capture an image for intermediate brightness based on which the distance to a subject having the intermediate brightness can be calculated and the image for high brightness based on which the distance to a subject having the high brightness can be calculated by adjusting a voltage value applied to the drive electrode.

When the liquid crystal panel PNL adopts the normally-black mode as described above, the second operation example can reduce the application voltage (value of the voltage applied to a drive electrode) at the time of capturing the image for high brightness, compared to the first operation example. Therefore, the second operation example can suppress energy consumption. Further, the second operation example can be applied in a case where the brightness maintains saturated even by shortening the light exposure time.

When the camera module CM captures a plurality of images successively (in other words, capturing a video) in the first operation example and the second operation example, an image for intermediate brightness and an image for high brightness need to be captured as one frame picture, decreasing the frame rate. Therefore, as the modified example of the first operation example, a configuration in which an image for intermediate brightness and an image for high brightness are captured by jointly using a certain light exposure time (in other words, an image for high brightness is captured in the light exposure time for capturing an image for intermediate brightness) may be adopted.

Figure 14:
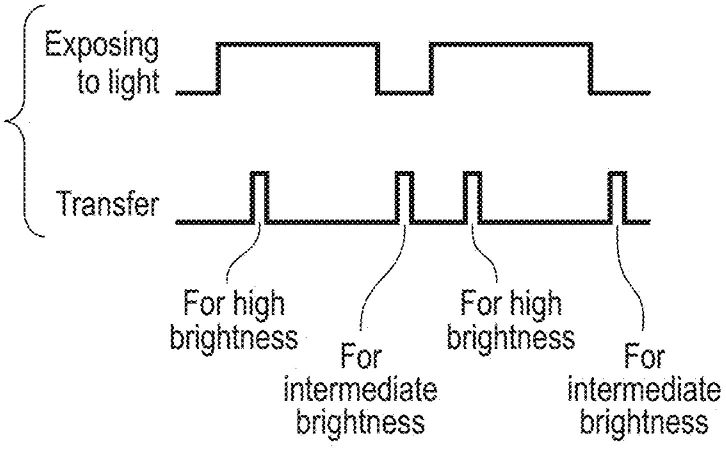
FIG. 14 is a diagram showing a third operation example of the camera module of the present embodiment.

A third operation example of the camera module CM of the present embodiment will be described with reference to FIG. 14. FIG. 14 shows time in which the driver DR drives the liquid crystal layer LC to make light incident on the image sensor IS (light exposure time) and timing at which an image, which has been captured by the light being made incident on the image sensor IS in the light exposure time, is transferred to the outside.

In the third operation example, the driver DR drives the liquid crystal layer LC based on a certain light exposure time of the image sensor IS. The light exposure time in the third operation example is the same as, for example, the light exposure time for intermediate brightness in the first operation example.

In the third operation example, the image sensor IS transfers an image for high brightness based on amount of light made incident on the image sensor IS at the time point that is before the end of the light exposure time in which the driver DR drives the liquid crystal layer LC.

Next, the image sensor IS transfers the image for intermediate brightness based on amount of light made incident on the image sensor IS at the end of the light exposure time.

The third operation example can capture both an image for intermediate brightness and an image for high brightness in one exposure time for capturing an image for intermediate brightness in each of the first operation example and the second operation example. Thus, the third operation example can achieve high frame rate, compared to the first operation example and the second operation example.

It has been described that a subject having the high brightness is present in the image capturing range of the camera module CM. Capturing an image for high brightness without the presence of a subject having the high brightness causes the decrease in the frame rate or the increase in processing amount for the camera module CM.

Therefore, the camera module CM of the present embodiment may adopt the configuration of switching operation modes according to the presence or absence of a subject having the high brightness in the image capturing range of the camera module CM.

More specifically, in usual state, the camera module CM may operate in a first operation mode of successively capturing images for intermediate brightness. When a subject having the high brightness (area including the subject having the high brightness) is detected in the images for intermediate brightness by analyzing the images for intermediate brightness, the camera module CM may operate in a second operation mode of capturing an image for intermediate brightness and an image for high brightness. The process of analyzing the image for intermediate brightness can be achieved by an electronic apparatus on which the camera module CM is mounted or by a processing circuit and the like mounted on the camera module CM.

It has been described that the camera module CM of the present embodiment is used to make a distance map indicating the distance to the subject. The distance map, which is to be made when the image for intermediate brightness and the image for high brightness are captured, will be briefly described with reference to FIG. 15. As described above, the processes of making the distance map is conducted by the electronic apparatus on which the camera module CM is mounted.

Figure 15:
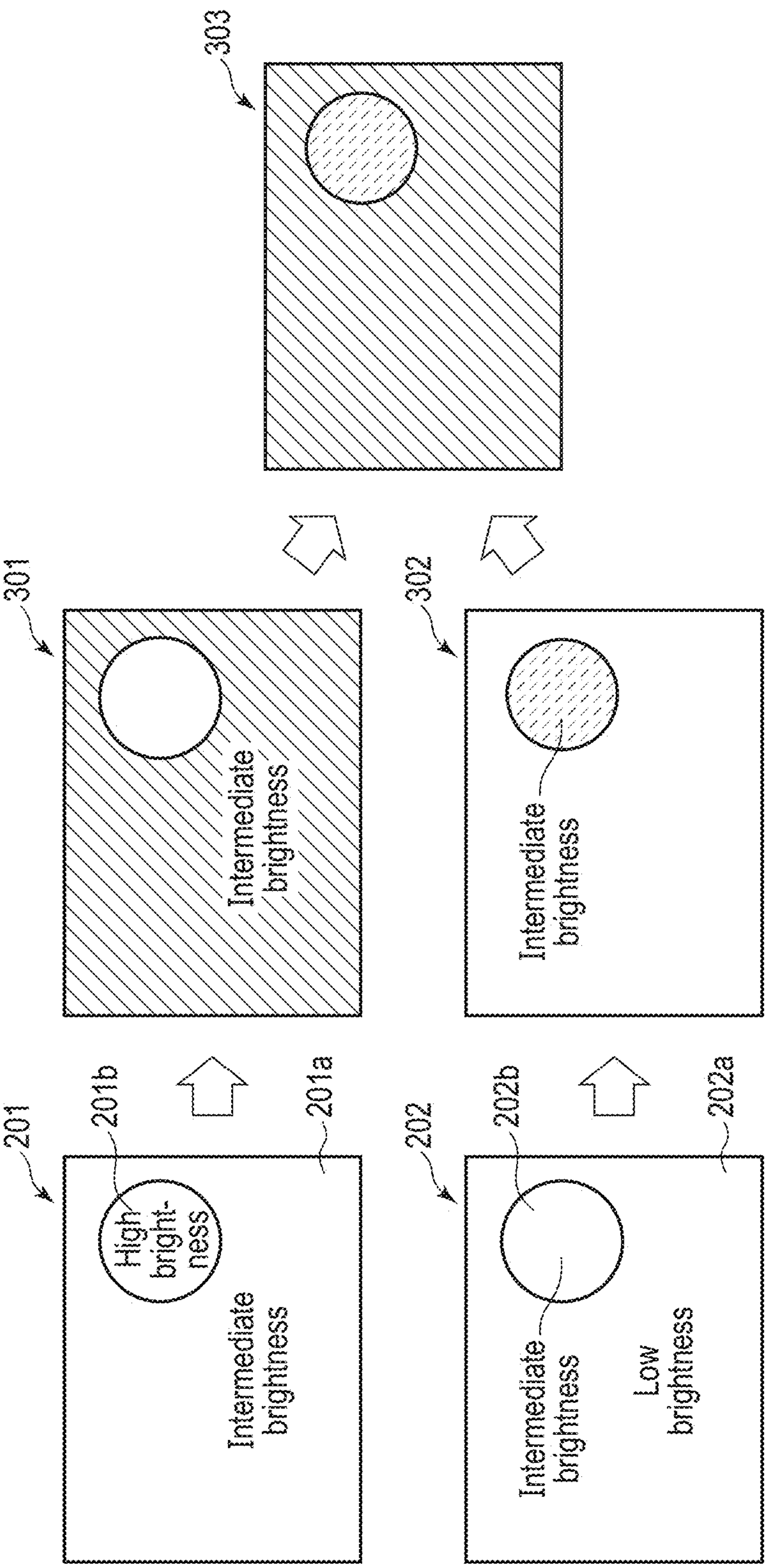
FIG. 15 is a diagram for explaining a distance map, which is to be made when an image for intermediate brightness and an image for high brightness are captured.

The upper half in FIG. 15 schematically shows an image for intermediate brightness 201 and a distance map 301 including a distance to subject calculated based on the image for intermediate brightness 201.

The image for intermediate brightness 201 includes an intermediate brightness area (area including a subject having the intermediate brightness) 201*a* and a high brightness area (area including a subject having the high brightness) 201*b*. When a distance to the subject included in the image for intermediate brightness 201 is calculated using the image for intermediate brightness 201, a distance to the subject included in the intermediate brightness area 201*a* can be accurately calculated, but a distance to the subject included in the high brightness area 201*b* cannot be calculated. In this case, a distance map 301 in which the distance to the subject included in the intermediate brightness area 201*a* is allocated to the intermediate brightness area 201*a* included, for example, in the image for intermediate brightness 201 is made.

In contrast, the lower half in FIG. 15 schematically shows an image for high brightness 202 and a distance map 302 including a distance to subject calculated based on the image for high brightness 202.

The brightness of a subject is suppressed in the image for high brightness 202 as described above. Therefore, the image for high brightness 202 includes a low brightness area (area including a subject having the low brightness) 202*a* and an intermediate brightness area (area including a subject having the intermediate brightness) 202*b*. The low brightness area 202*a* corresponds to an area in which the brightness of a subject included in the intermediate brightness area 201*a* is suppressed, the area 201*a* being included in the image for intermediate brightness 201. The intermediate brightness area 202*b* corresponds to an area in which the brightness of the subject included in the high brightness area 201*b* is suppressed, the high brightness area 201*b* being included in the image for intermediate brightness 201. When a distance to the subject included in the image for high brightness 202 is calculated using the image for high brightness 202, a distance to the subject included in the intermediate brightness area 202*b* can be accurately calculated. Thus, for example, a distance map 302 in which the distance to the subject included in the intermediate brightness area 202*b* is allocated to the intermediate brightness area 202*b* included, for example, in the image for high brightness 202 is made.

The present embodiment can make a distance map 303 in which a distance to subject with high accuracy is allocated to all of areas by combining the distance map 301 made based on the image for intermediate brightness 201 and the distance map 302 made based on the image for high brightness 202.

With respect to the present embodiment, the case where a subject having the high brightness is present in the image capturing range of the camera module CM (in other words, a case where the distance to the subject having the high brightness cannot be calculated). Similarly, when a subject having the low brightness is present in the image capturing range, the calculation of the distance to the subject is difficult.

Figure 16:
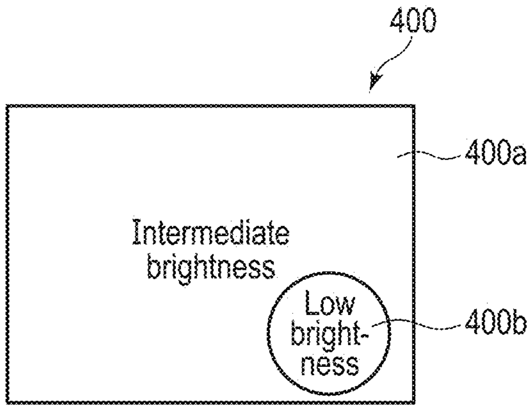
FIG. 16 is a diagram showing another example of an image transferred from the image sensor.

FIG. 16 shows an example of an image transferred from the image sensor IS when the driver DR drives the liquid crystal layer LC to achieve the light exposure time shown in FIG. 10. It assumes a case where a subject having the intermediate brightness and a subject having the low brightness are present in the image capturing range of the camera module CM. Here, an image 400 shown in FIG. 16 includes an intermediate brightness area 400*a* and a low brightness area 400*b*.

The intermediate brightness area 400*a* is an area containing a subject having the intermediate brightness. As described above, a distance to subject with high accuracy can be calculated in the intermediate brightness area 400*a*.

In contrast, S/N ratio in the image sensor IS is low in the low brightness area 400*b* containing a subject having the low brightness. Therefore, the distance to subject with high accuracy cannot be calculated in the low brightness area 400*b*.

Figure 17:
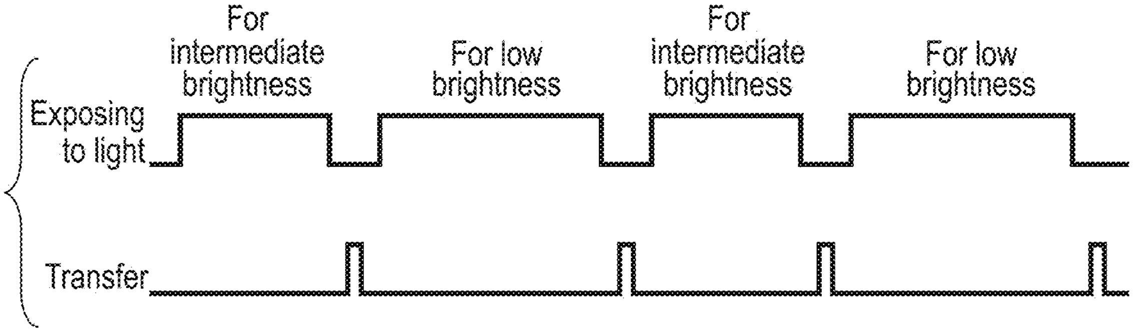
FIG. 17 is a diagram showing a fourth operation example of the camera module of the present embodiment.

A fourth operation example of the camera module CM of the present embodiment will be described with reference to FIG. 17. FIG. 17 shows time in which the driver DR drives the liquid crystal layer LC to make light incident on the image sensor IS (light exposure time) and timing at which an image, which has been captured by the light being made incident on the image sensor IS in the light exposure time, is transferred to the outside.

In the fourth operation example, the driver DR drives the liquid crystal layer LC based on the light exposure time for intermediate brightness (control value). In this case, the image, which has been captured based on light made incident on the image sensor IS in the light exposure time for intermediate brightness (image for intermediate brightness) is transferred from the image sensor IS.

Next, the driver DR drives the liquid crystal layer LC based on the light exposure time for low brightness (control value). In this case, the image, which has been captured based on light made incident on the image sensor IS in the light exposure time for low brightness (hereinafter referred to as an image for low brightness) is transferred from the image sensor IS.

When a video is captured in the fourth operation example, an image for intermediate brightness and an image for low brightness are alternately captured (in other words, the drive of the liquid crystal layer LC based on the light exposure time for intermediate brightness and the drive of the liquid crystal layer LC based on the light exposure time for low brightness are repeatedly conducted).

Here, the light exposure time for intermediate brightness in the fourth operation example is the same as the light exposure time shown in FIG. 10. The light exposure time for low brightness is set to be longer than the light exposure time for intermediate brightness. Therefore, by lengthening the light exposure time in the cases of an image for low brightness, the brightness of a subject distance to which cannot be calculated in an image for intermediate brightness due to the low brightness can be increased. In other words, the image for low brightness in the fourth operation example is an image for accurately calculating a subject having the low brightness.

By adjusting the light exposure time, the fourth operation example can capture an image for intermediate brightness based on which a distance to a subject having the intermediate brightness can be calculated and an image for low brightness based on which a distance to a subject having the low brightness can be calculated.

The fourth operation example assumes a case where the driver DR drives the liquid crystal layer LC to adjust the light exposure time. This light exposure time may be adjusted by the image sensor IS, or may be adjusted by, for example, controlling a physical shutter and the like.

The fourth operation example needs to capture an image for intermediate brightness and an image for low brightness as one frame image, decreasing the frame rate. Therefore, the third operation example assuming the presence of a subject having high brightness in the image capturing range may be applied to the fourth operation example to achieve the configuration of capturing an image for intermediate brightness in the light exposure time for capturing an image for low brightness.

It has been described that the second operation example can capture an image for high brightness by adjusting a value of a voltage applied to a drive electrode. When the image for intermediate brightness is captured in the second operation example, a value of a voltage applied to the drive electrode (in other words, light transmittance rate in the liquid crystal layer LC) is close to the maximum value. Therefore, in the second operation example, an image for low brightness in which the brightness of a subject is increased by adjusting the value of the voltage cannot be captured.

The configuration of capturing an image for low brightness using gain (analog gain) that adjusts a voltage signal corresponding to amount of light made incident on the image sensor IS may be adopted.

Figure 18:
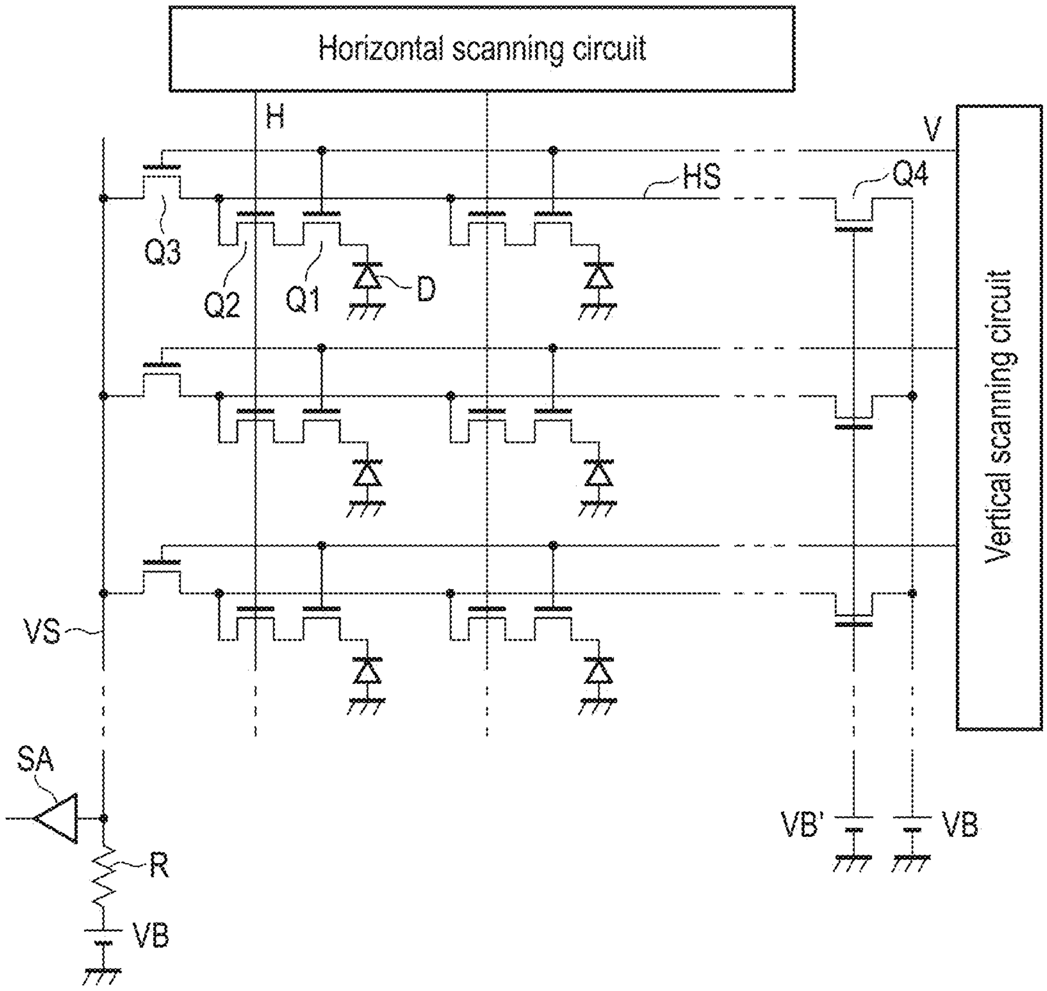
FIG. 18 is a diagram showing an example of a circuit of the image sensor.

FIG. 18 shows an example of a circuit diagram of the image sensor IS. The image sensor IS includes a vertical scanning circuit VSR, a horizontal scanning circuit HSR, and a light-receiving portion. The light-receiving portion includes a plurality of pixel cells corresponding to a plurality of pixels constituting an image captured by the camera module CM.

One pixel cell of the plurality of pixel cells is constituted by, for example, a series circuit including a switch MOSFETQ1 in which a gate is connected to a photodiode D and a vertical scanning line V and a switch MOSFETQ2 in which a gate is connected to a horizontal scanning line H.

Output nodes of the pixel cells that are the same as the pixel cells constituted by the photodiode D, the switch MOSFETQ1, and the switch MOSFETQ2 and are arranged in the same row (horizontal direction) of the pixel cells constituted by the photodiode D and the switches MOSFETQ1 and Q2 are connected to a horizontal signal line HS elongating in the lateral direction in FIG. 18. The same pixel cells are formed in the other rows as well.

The vertical scanning line V is arranged to be parallel to the horizontal signal line HS. A switch MOSFET of each of the plurality of pixel cells arranged on the same row corresponding to the vertical scanning line V is connected to the vertical scanning line V. This applies to other vertical scanning lines as well.

The horizontal scanning line H elongates in the vertical direction in FIG. 18. A switch MOSFET of each of the plurality of pixel cells arranged on the same row corresponding to the horizontal scanning line H is connected to the horizontal scanning line H. This applies to other horizontal scanning lines as well.

Further, the vertical scanning line V is connected to a gate of a switch MOSFETQ3 connecting the horizontal signal line HS with an output line VS elongating in the vertical (perpendicular) direction. A load resistance R for reading is provided between the output line VS and a bias voltage VB. In this configuration, a current, which corresponds to amount of light (light signal) accumulated in a photodiode in the pixel cell, flows. Thus, the read operation from the pixel cell and a reset (precharge) operation for next read operation are simultaneously performed. A voltage signal obtained by the load resistance R (voltage signal corresponding to amount of light) is amplified by a sense amplifier SA and then is transmitted to an output signal (not shown).

Though it is not limited, a MOSFETQ4 to be formed substantially as a diode is provided on the horizontal signal line HS in order to remove a fake signal such as smear and blooming. That is, the bias voltage VB is applied to a drain of the MOSFETQ4. A bias voltage VB' is applied to a gate of the MOSFETQ4. By setting both bias voltages VB and VB' to be equivalent to each other, the gate and the drain of the MOSFETQ4 are supplied with the same potential voltage. Thus, the MOSFETQ4 is formed as the diode.

The conductance of the MOSFETQ4 is set to be sufficiently smaller than the one in the switch MOSFETQ3. In other words, on-resistance value of the MOSFETQ4 is set to be sufficiently greater than the one in the switch MOSFETQ3. For example, when the vertical scanning line V is in the high-level state, one switch MOSFETQ3 and each switch MOSFET of the pixel cells arranged on this row (for example, the switch MOSFETQ1 and the like) are set in the on state. In this case, when the horizontal scanning line H is in the high-level state, each switch MOSFET of the pixel cells on the row corresponding to the horizontal scanning line H (for example, the switch MOSFETQ2 and the like) are set in the on state. Thus, read operation from one pixel cell arranged at the intersection of the rows is carried out.

It has been described that the voltage signal corresponding to amount of light accumulated in the photodiode (in other words, amount of light made incident on the image sensor IS) is amplified by the sense amplifier SA in FIG. 18. This amount of the amplification is adjusted by the analog gain.

Figure 19:
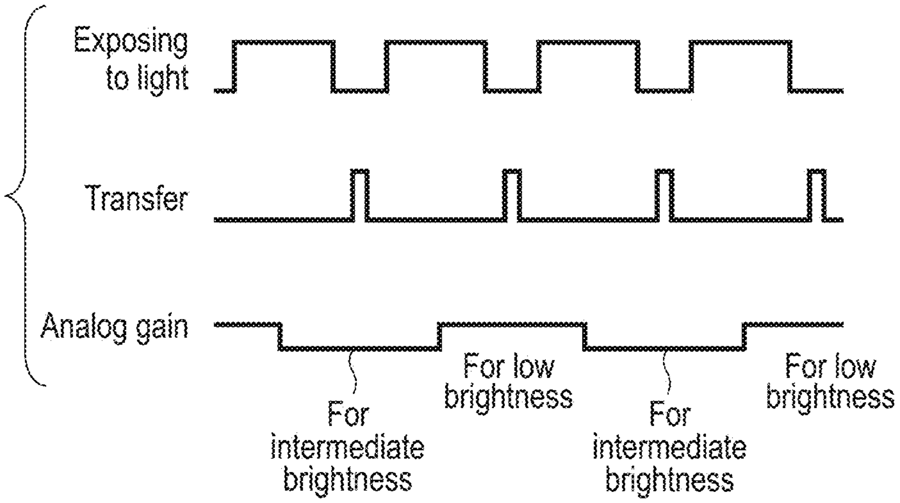
FIG. 19 is a diagram showing a fifth operation example of the camera module of the present embodiment.

A fifth operation example of the camera module CM of the present embodiment will be described with reference to FIG. 19. FIG. 19 shows time in which the driver DR drives the liquid crystal layer LC to make light incident on the image sensor IS (light exposure time) and timing at which an image, which has been captured by the light being made incident on the image sensor IS in the light exposure time, is transferred to the outside, together with the above analog gain.

In the fifth operation example, the driver DR drives the liquid crystal layer LC based on a certain light exposure time. The light exposure time in the fifth operation example is the same as, for example, the light exposure time for intermediate brightness in the fourth operation example.

In the fifth operation example, the image sensor IS adjusts (amplifies) the voltage signal corresponding to the amount of light made incident on the image sensor IS in, for example, a first light exposure time by using an analog gain for intermediate brightness. The image sensor IS transmits the image based on the value of the voltage adjusted in this manner (image for intermediate brightness).

Next, the image sensor IS adjusts (amplifies) the voltage signal corresponding to the amount of light made incident on the image sensor IS in a following second light exposure time by using an analog gain for low brightness. The image sensor IS transmits the image based on the value of the voltage adjusted in this manner (image for low brightness).

Generally, analog gains are constant. The analog gain for intermediate brightness in the fifth operation example is set to be substantially equivalent to the constant analog gain. In contrast, the analog gain for low brightness (second gain) in the fifth operation example is set to be higher than the analog gain for intermediate brightness (first gain). Therefore, by conducting amplification with higher analog gains, the brightness of a subject distance to which cannot be calculated in the image for intermediate brightness due to the low brightness can be increased. In other words, the image for low brightness in the fifth operation example is the same as the image for low brightness in the fourth operation example and thus is an image for accurately calculating a subject having the low brightness.

By fluctuating analog gains, the fifth operation example can capture an image for intermediate brightness based on which a distance to a subject having the intermediate brightness (first brightness) can be calculated and an image for low brightness based on which a distance to a subject having the low brightness (second brightness) can be calculated.

It has been described that a subject having the low brightness is present in the image capturing range of the camera module CM. Capturing the image for low brightness without the presence of a subject having the low brightness causes the decrease in the frame rate or the increase in processing amount for the camera module CM.

Therefore, the camera module CM of the present embodiment may adopt the configuration of switching operation modes according to the presence or absence of a subject having the low brightness in the image capturing range of the camera module CM.

More specifically, in usual state, the camera module CM may operate in the first operation mode of successively capturing images for intermediate brightness. When a subject having the low brightness (area including the subject having the low brightness) is detected in the images for intermediate brightness by analyzing the images for intermediate brightness, the camera module CM may operate in the second operation mode of capturing an image for intermediate brightness and an image for low brightness. The process of analyzing the image for intermediate brightness can be achieved by an electronic apparatus on which the camera module CM is mounted or by a processing circuit and the like mounted on the camera module CM.

A distance map, which is to be made when an image for intermediate brightness and an image for low brightness are captured will be described with reference to FIG. 20.

Figure 20:
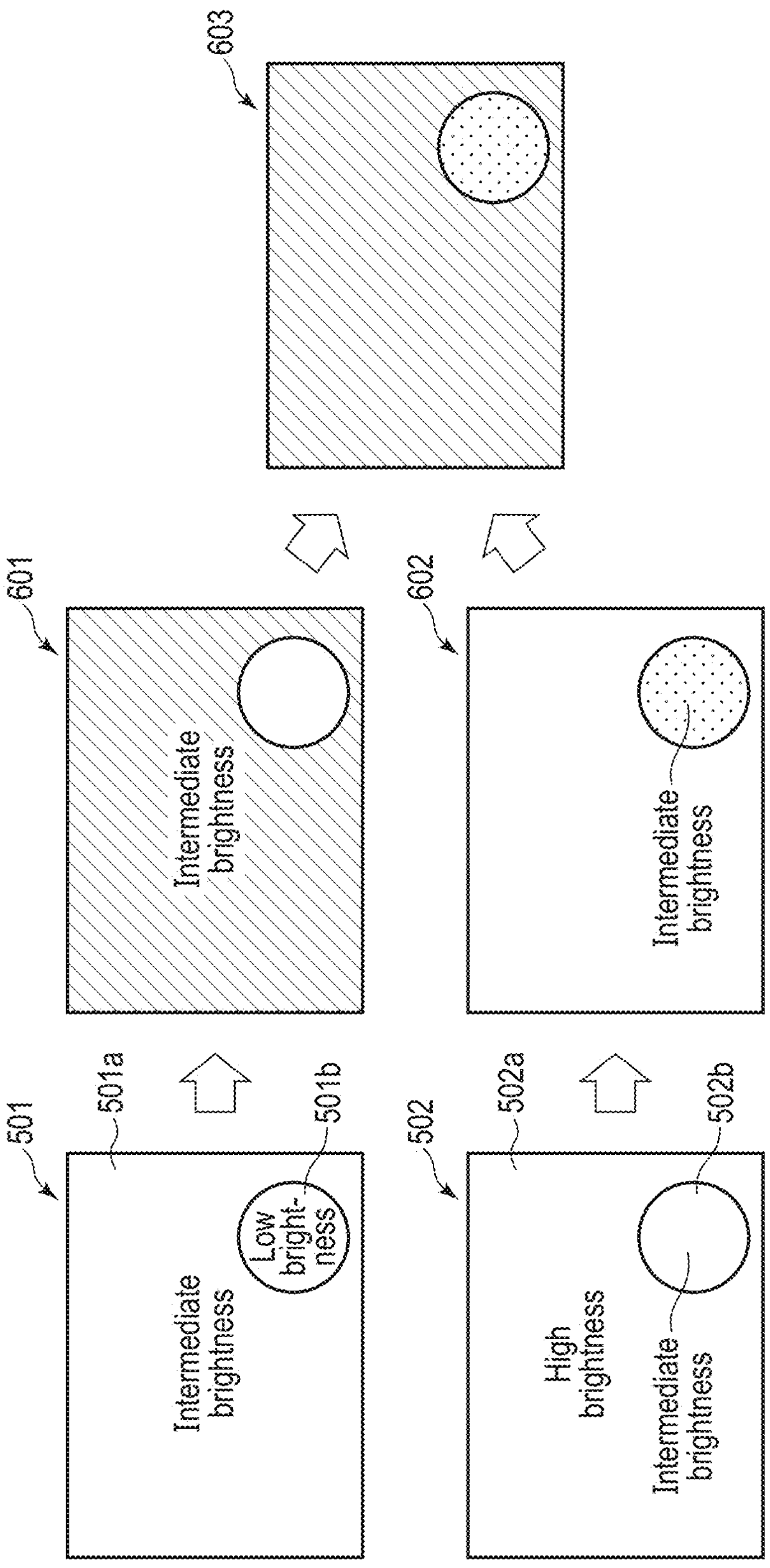
FIG. 20 is a diagram for explaining a distance map, which is to be made when an image for intermediate brightness and an image for low brightness are captured.
Figure 21:
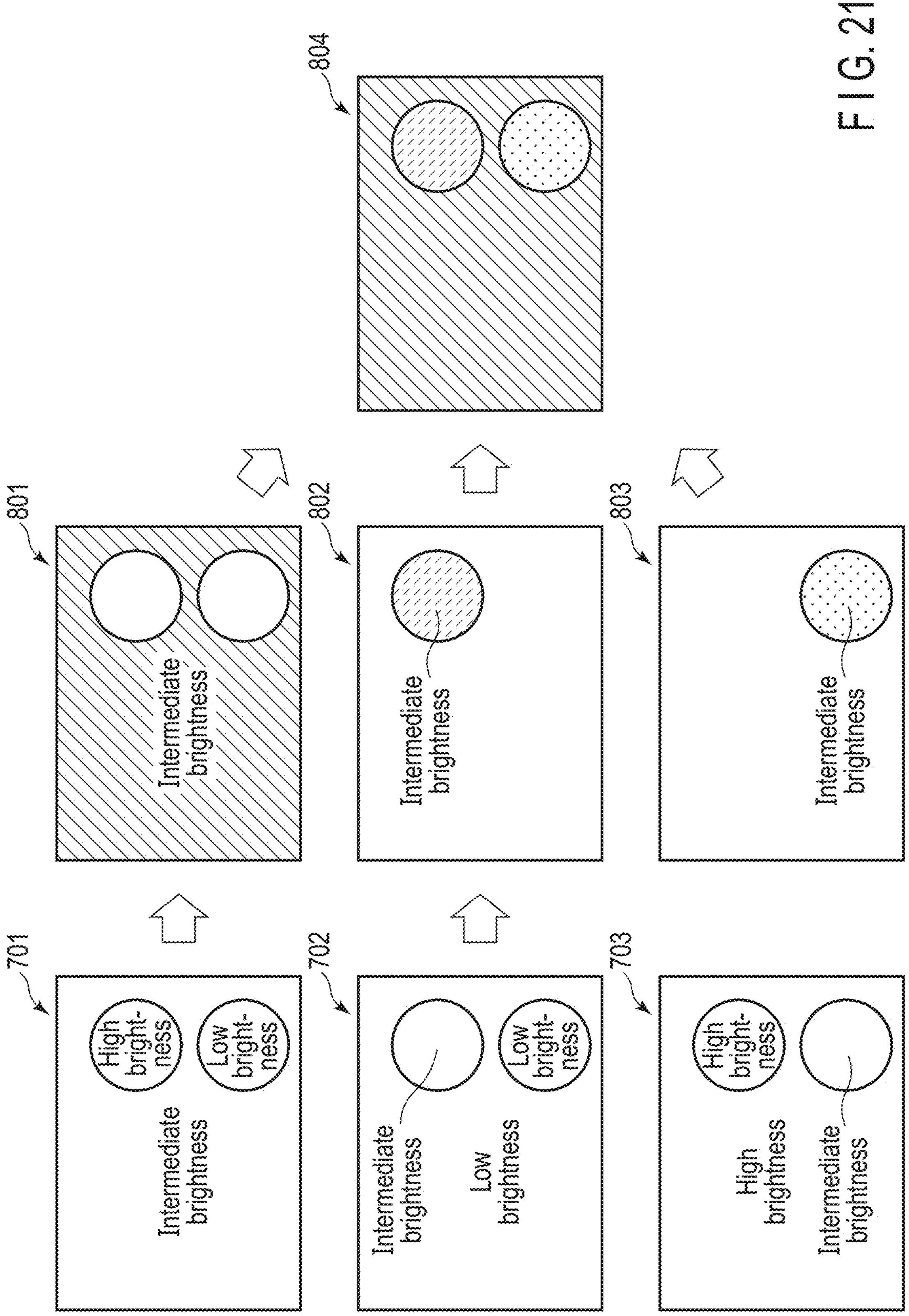
FIG. 21 is a diagram for explaining a distance map, which is to be made when an image for intermediate brightness, an image for high brightness, and an image for low brightness are captured.

The upper half in FIG. 20 schematically shows an image for intermediate brightness 501 and a distance map 601 including a distance to subject calculated based on the image for intermediate brightness 501.

The image for intermediate brightness 501 includes an intermediate brightness area (area including a subject having the intermediate brightness) 501*a* and a low brightness area (area including a subject having the low brightness) 501*b*. When a distance to the subject included in the image for intermediate brightness 501 is calculated using the image for intermediate brightness 501, a distance to the subject included in the intermediate brightness area 501*a* can be accurately calculated, but the calculation of a distance to the subject included in the low brightness area 501*b* is difficult. In this case, a distance map 601 in which the distance to the subject included in the intermediate brightness area 501*a* is allocated to the intermediate brightness area 501*a* included, for example, in the image for intermediate brightness 501 is made.

In contrast, the lower half in FIG. 20 schematically shows an image for low brightness 502 and a distance map 602 including a distance to subject calculated based on the image for intermediate brightness 502.

The brightness of a subject is increased in the image for low brightness 502 as described above. Therefore, the image for low brightness 502 includes a high brightness area (area including a subject having the high brightness) 502*a* and an intermediate brightness area (area including a subject having the intermediate brightness) 502*b*. The high brightness area 502*a* corresponds to an area in which the brightness of the subject included in the intermediate brightness area 501*a* is increased, the area 501*a* being included in the image for intermediate brightness 501. The intermediate brightness area 502*b* corresponds to an area in which the brightness of the subject included in the low brightness area 501*b* is increased, the low brightness area 501*b* being included in the intermediate brightness area 502*b*. When a distance to the subject included in the image for low brightness 502 is calculated using the image for intermediate brightness 502, a distance to the subject included in the intermediate brightness area 502*b* can be accurately calculated. In this case, a distance map 602 to which a distance to the subject included in the intermediate brightness area 502*b* is allocated to the intermediate brightness area 502*b* included, for example, in the image for low brightness 502 is made.

The present embodiment can make a distance map 603 in which a distance to the subject with high accuracy is allocated to all of areas of the distance map by combining the distance map 601 made based on the image for intermediate brightness 501 and the distance map 602 made based on the image for low brightness 502.

With respect to present embodiment, the first to third operation examples in which a subject having the high brightness is present in the capturing range and the fourth to fifth operation examples in which a subject having the low brightness is present in the capturing range have been described. When both of a subject having the high brightness and a subject having the low brightness are present in the capturing range, the operation combining any one operation of the first to third operation examples and any one of the fourth to fifth operation examples may be performed. This configuration can capture an image for intermediate brightness for calculating a distance to a subject having the intermediate brightness, an image for high brightness for calculating a distance to a subject having the high brightness, and an image for low brightness for calculating a distance to a subject having the low brightness.

When the camera module CM captures an image for intermediate brightness 701, an image for high brightness 702, and an image for low brightness 703, a distance map 804 can be made by combining a distance map 801 made based on the image for intermediate brightness 701, a distance map 802 made based on the image for high brightness 702, and a distance map 803 made based on the image for low brightness 703.

As described above, the present embodiment can provide a camera module that can capture an image based on which an accurate distance can be calculated.

All camera modules, which are implementable with arbitrary changes in design by a person of ordinary skill in the art based on the camera modules described above as the embodiments of the present invention, belong to the scope of the present invention as long as they encompass the spirit of the present invention.

Various modifications are easily conceivable within the category of the idea of the present invention by a person of ordinary skill in the art, and these modifications are also considered to belong to the scope of the present invention. For example, additions, deletions or changes in design of the constituent elements or additions, omissions or changes in condition of the processes may be arbitrarily made to the above embodiments by a person of ordinary skill in the art, and these modifications also fall within the scope of the present invention as long as they encompass the spirit of the present invention.

In addition, the other advantages of the aspects described in the above embodiments, which are obvious from the descriptions of the specification or which are arbitrarily conceivable by a person of ordinary skill in the art, are considered to be achievable by the present invention as a matter of course.

What is claimed is:

1. A camera module, comprising:
an image sensor; and
a liquid crystal panel, wherein
the liquid crystal panel includes:
an aperture portion arranged at a position for making light incident on the image sensor;
a liquid crystal layer arranged at a position overlapping the aperture portion;
an electrode arranged at a position overlapping the liquid crystal layer; and
a driver configured to drive the liquid crystal layer by applying a voltage to the electrode, wherein
the driver is configured to drive the liquid crystal layer such that light is made incident on the image sensor in a predetermined light exposure time,
the image sensor is configured to adjust a voltage signal corresponding to amount of light made incident on the imaging element in a first light exposure time by using a first gain, and adjust a voltage signal corresponding to amount of light made incident on the imaging element in a second light exposure time following the first light exposure time by using a second gain higher than the first gain, a first image based on the voltage signal adjusted using the first gain is used to calculate a distance to a subject having a first brightness included in the first image, and a second image based on the voltage signal adjusted using the second gain is used to calculate a distance to a subject having a second brightness lower than the first brightness, the second brightness being included in the second image.

* * * * *